US010042357B2

(12) United States Patent
Moyne et al.

(10) Patent No.: US 10,042,357 B2
(45) Date of Patent: Aug. 7, 2018

(54) PORTABLE, ADAPTABLE EQUIPMENT HEALTH USER INTERFACE (71) Applicant: Applied Materials, Inc., Santa Clara, CA (US)

(72) Inventors: James R. Moyne, Canton, MI (US); Jimmy Iskandar, Fremont, CA (US); Bradley D. Schulze, Phoenix, AZ (US)

(73) Assignee: Applied Materials, Inc., Santa Clara, CA (US)

( * ) Notice: Subject to any disclaimer, the term of this patent is extended or adjusted under 35 U.S.C. 154(b) by 791 days.

(21) Appl. No.: 14/061,725

(22) Filed: Oct. 23, 2013

(65) Prior Publication Data

US 2014/0114611 A1  Apr. 24, 2014

Related U.S. Application Data (60) Provisional application No. 61/717,521, filed on Oct. 23, 2012.

(51) Int. Cl.
| G06F 11/30 | (2006.01) |
| G21C 17/00 | (2006.01) |
| G05B 23/02 | (2006.01) |
| G05B 19/418 | (2006.01) |

(52) U.S. Cl.
CPC ..... *G05B 23/0272* (2013.01); *G05B 19/4184* (2013.01); *G05B 23/024* (2013.01); *Y02P 90/14* (2015.11)

(58) Field of Classification Search
CPC .................. G05B 23/0272; G05B 19/4184
USPC ........................................ 702/183, 182, 188
See application file for complete search history.

(56) References Cited

U.S. PATENT DOCUMENTS

| 6,587,744 | B1* | 7/2003 | Stoddard | G05B 19/41885 438/14 |
| 6,597,381 | B1* | 7/2003 | Eskridge | G06F 3/0481 382/145 |
| 7,570,797 | B1* | 8/2009 | Wang | G01N 21/9501 250/559.45 |
| 2002/0077711 | A1* | 6/2002 | Nixon | C10G 11/187 700/51 |
| 2002/0116083 | A1* | 8/2002 | Schulze | H01L 22/20 700/108 |
| 2006/0028646 | A1* | 2/2006 | Davis | G01B 11/24 356/445 |
| 2009/0037013 | A1* | 2/2009 | Hendler | G05B 19/41875 700/103 |
| 2009/0217183 | A1* | 8/2009 | Moyne | G06F 3/0481 715/762 |
| 2013/0147828 | A1* | 6/2013 | Vogel | G09G 5/02 345/589 |
| 2013/0268238 | A1* | 10/2013 | McCready | G05B 23/024 702/179 |
| 2013/0331963 | A1* | 12/2013 | Ahangar | G05B 23/0272 700/83 |

\* cited by examiner

*Primary Examiner* — Eman Alkafawi
(74) *Attorney, Agent, or Firm* — Lowenstein Sandler LLP (57) ABSTRACT

Described herein are methods and systems for providing a user interface to indicate health of a tool in a manufacturing facility. A method may include receiving, via a user interface, user selection of fault detection data pertaining to a tool in a manufacturing facility, obtaining health abnormality indicators of the tool using the fault detection data, and presenting the health abnormality indicators of the tool in the user interface.

20 Claims, 5 Drawing Sheets

PORTABLE, ADAPTABLE EQUIPMENT HEALTH USER INTERFACE

RELATED APPLICATION

This patent application claims the benefit under 35 U.S.C. § 119(e) of U.S. Provisional Application No. 61/717,521 filed Oct. 23, 2012, which is herein incorporated by reference.

TECHNICAL FIELD

The technical field relates generally to systems and methods for presenting fault detection data pertaining to a manufacturing facility, and more specifically to systems and methods for providing equipment health user interface.

BACKGROUND

With the on-going pressures of lowering cost, improving quality and reducing variability in the face of larger wafer and smaller feature sizes, the nano-manufacturing industry has begun to embrace a move from a reactive to predictive paradigm of operation. Predictive capabilities such as predictive maintenance (PdM) are cited by the International Technology Roadmap for Semiconductors as critical technologies to incorporate into production over the next several years. These predictive capabilities utilize information such as fault detection outputs, metrology data and maintenance data to determine the state of the equipment and project its future state (e.g., a need for a specific maintenance at a specified future time).

BRIEF DESCRIPTION OF THE DRAWINGS

The present disclosure will be more readily understood from the detailed description of exemplary embodiments presented below considered in conjunction with the attached drawings, of which.

DETAILED DESCRIPTION

Described herein is a mechanism for providing a graphical user interface in which a user can view data values that communicate health of equipment in a manufacturing facility.

Having predictive capabilities such as predictive maintenance in a manufacturing facility (e.g., a semiconductor manufacturing facility) can be important for reducing unscheduled downtime, maintaining high quality and reducing cost. These predictive capabilities can utilize information such as fault detection outputs, metrology data and maintenance data to determine the state of the equipment and project its future state (e.g., a need for a specific maintenance at a specified future time). A capability that can be leveraged in providing this information is Equipment Health Monitoring (EHM). EHM provides a multivariate description or fingerprint of a tool state and uses this knowledge to determine when the state of the tool or a specific component of the tool is no longer "normal." EHM can thus be used to determine when equipment operation is "not normal" which is often equated to health issues. A solution that provides an indication of equipment health can provide benefits of reduced scrap, improved yield, reduced unscheduled downtime, and reduced mean-time-to-repair; this solution can also be an important component of predictive maintenance (PdM) solutions. The solution should be low cost (therefore leveraging the existing data collection and analysis infrastructure), non-invasive, portable (chamber-to-chamber and tool-to-tool) and easy to use. Further it should be able to be deployed quickly, but also be configurable to provide insight into equipment health on a component by component basis.

Aspects of the present disclosure provide a graphical user interface (GUI) that indicates ongoing equipment health, and is portable, adaptable and/or resettable. The GUI can be provided based on historical and/or current equipment state data (e.g., equipment temperature values, equipment pressure values, etc.). The equipment state data can include fault detection data obtained using specific fault detection control (FDC) methods pertaining to different tools. The GUI may allow a user to select a specific tool and/or specific instance (e.g., chamber) of the tool, present fault detection data available for the selected tool, and allow the user to select at least a subset of the presented fault detection data. The user may select multiple tools and overlay signals to investigate differences in health signatures between tools or chambers. A multivariate analysis (MVA) technique such as Principle Components Analysis (PCA) can be applied to the selected fault detection data to produce abnormal health indicators of the tool.

According to aspects of the present disclosure, the abnormal health indicators are automatically deduced and displayed in the GUI irregardless of the fault detection methods that are provided for the tool. The abnormal health indicators can be automatically updated if the fault detection methods provided for the tool are modified or if a user intervenes and suggests a reduced or expanded set (e.g., a set that better indicates health problems that the user wants to focus on or that are more directly linked to the health components that would be replaced during maintenance). The abnormal health indicators can be different based on different recipes used for the tool. The abnormal health indicators can also be updated on a "run-to-run" basis or a wafer-to-wafer basis. The abnormal health indicators can be provided in a similar manner for individual instances (e.g., chambers) of the same tool type or individual tools, making the resulting GUI portable (chamber-to-chamber and tool-to-tool). In the same manner, the health indicators can be displayed for multiple instances, e.g., as part of an effort to explore chamber matching.

According to some aspects of the present disclosure, as processes drift and shift over time, the GUI can present MVA indicators that are adapted to those changes (e.g., through a moving window or similar approach for gradual adaptation, and/or using control rule strategies for larger and more significant changes such as recipe changes or maintenance events). The adaptation rate can be set and adjusted. This adaptation can reduce the occurrence of false positives (false indications of bad health). A concept for adaptation can include a context based reset adaptation outer loop with a point-by-point MVA updating inner loop. The outer loop can execute whenever a context event is detected that requires a model reset (such as a recipe change or a maintenance event). The inner loop can execute when the outer loop is not being executed (e.g., at predefined time intervals).

According to some aspects of the present disclosure, context event indications can be provided in the GUI with the abnormal health indicators (e.g., as vertical bars) to reduce false alarms to a user. The abnormal heath indicators can be deduced using a statistical (e.g., MVA) health model of the tool that corresponds to the normal health state of the tool. In some embodiments, control rule strategies or manual intervention can be used to reset the MVA models. This resetting can happen, for example, if a number of false positives are observed or if the target equipment is in a significantly different state (e.g., after a maintenance event).

According to some aspects of the present disclosure, user interface features such as chart "flipping" can be used to view multiple MVA statistics on a single dashboard to make the dashboard more informative. In some embodiments, the GUI provides an overall indication of tool health, a pareto of contributors to deviation from a healthy pattern, a run-to-run plot of each contributor, and a within-run plot of the trace data relating to each contributor, and focused health indicators, where all this information is presented in a compact dashboard fashion with drill-down (e.g., pop-up windows) presentation of some information such as contributor plots.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
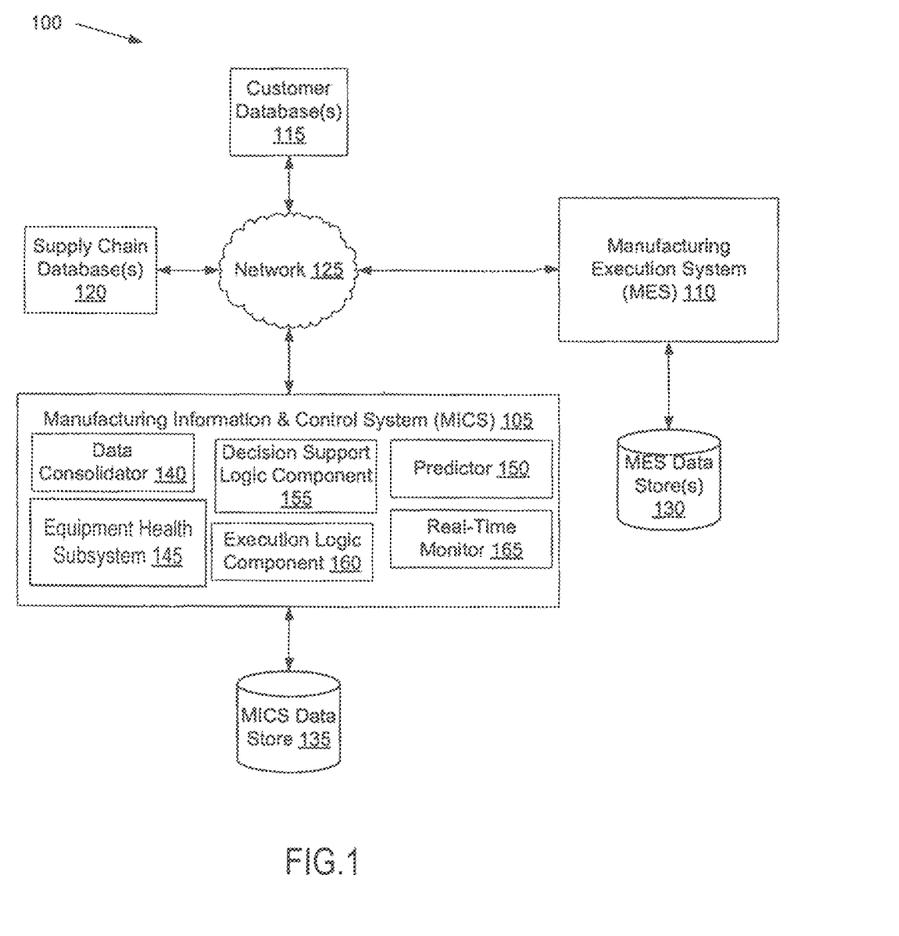
FIG. 1 illustrates an exemplary architecture of a manufacturing environment, in which embodiments of the present invention may operate.

FIG. 1A illustrates an exemplary architecture 100 of a manufacturing environment, in which embodiments of the present invention may operate. The manufacturing environment may be a semiconductor manufacturing environment, an automotive manufacturing environment, etc. In one embodiment, the architecture 100 includes one or more supply chain databases 120, one or more customer databases 115, a manufacturing execution system (MES) 110 and a manufacturing information and control system (MICS) 105, connected via a network 125.

The network 125 may be a public network (e.g., Internet), a private network (e.g., Ethernet or a local area Network (LAN)), or a combination thereof. The network 125 may include multiple private networks, which may be directly connected or connected via a public network. For example, the supply chain database 120 may be connected to a first private network controlled by suppliers of the manufacturing environment, the customer database 115 may be connected to a second private network controlled by a customer of the manufacturing environment, and the MICS 105 and MES 110 may be connected to a third private network. Each of these private networks may be connected via a public network.

A supply chain database 120 includes information available to and/or provided by a supplier or distributor. Such information may include, for example, a supplier's orders (e.g., of parts and goods), supplier inventory (e.g., current inventory, projected inventory, etc.), projected delivery dates, etc. Where materials are received from multiple distributors or suppliers, architecture 100 may include multiple supply chain databases 120. For example, a first supply-chain database may include information on raw goods, and a second supply-chain database may include information on manufacturing equipment.

A customer database 115 includes information available to and/or provided by a customer. Such information may include, for example, customer demand for specified articles of manufacture, customer inventory, etc. Architecture 100 may include a single customer database 115 for multiple customers, or multiple customer databases 115, each of which provides information about a distinct customer.

The manufacturing execution system (MES) 110 is a system that can be used to measure and control production activities in a manufacturing environment. The MES 110 may control some production activities (e.g., critical production activities) or all production activities of a set of manufacturing equipment (e.g., all photolithography equipment in a semiconductor fabrication facility), of a manufacturing facility (e.g., an automobile production plant), of an entire company, etc. The MES 110 may include manual and computerized off-line and/or on-line transaction processing systems. Such systems may include manufacturing machines, metrology devices, client computing devices, server computing devices, databases, etc. that may perform functions such as processing, equipment tracking, dispatching (e.g., determining what material goes to what processes), product genealogy, labor tracking (e.g., personnel scheduling), inventory management, costing, electronic signature capture, defect and resolution monitoring, key performance indicator monitoring and alarming, maintenance scheduling and so on. The MES 110 may detect malfunctioning of equipment in the manufacturing environment and/or record data pertaining to the equipment malfunctioning. In one embodiment the MES 110 is connected with one or more MES data stores 130. The MES data stores 130 may be databases, file systems, or other arrangements of data on nonvolatile memory (e.g., hard disk drives, tape drives, optical drives, etc.), volatile memory (e.g., random access memory (RAM)), or combination thereof. Each MES data store 130 may store, for example, historical process information of manufacturing recipes (e.g., temperatures, pressures, chemicals used, process times, etc.), equipment maintenance histories, inventories, etc.

The manufacturing information and control system (MICS) 105 combines disparate information from multiple different sources (e.g., data stores), and presents this information in a single interface. The MICS 105 can be used to gain an understanding of the manufacturing environment, and can enable a user to determine an efficiency of the manufacturing environment and/or how to improve all or components of the manufacturing environment. The MICS 105 may also draw inferences from, report out, and/or act upon the combined information. For example, MICS 105 can act as an early warning system (e.g., predict scrap, initiate product rework, etc.), provide bottleneck analysis, provide asset management (e.g., reduce unscheduled equipment downtime), improve lean practices, etc. In one embodiment, MICS 105 includes a data consolidator 140, a decision support module 155, an execution module 160, a predictor 150, and a real-time monitor 165.

The data consolidator 140 consolidates received data of past parameter values and/or present parameter values from multiple different sources (e.g., data stores). The manner in which the received data from the data sources is consolidated may be dependant upon relationships between the received data. Such relationships may be user defined. Moreover, sources from which data is consolidated, and the manner in which data is consolidated, can be user configurable. Therefore, as new data stores are added and/or old data stores are removed, data consolidator 140 may be adapted to accommodate the change.

In one embodiment, data consolidator 140 consolidates data from multiple MES data stores 130 (e.g., an inventory data store, a maintenance data store, a metrology data store, process data stores, etc.). In a further embodiment, the data consolidator 140 consolidates data from the supply chain databases 120 and/or customer databases 115. In yet a further embodiment, data consolidator 140 consolidates real-time data as the data is collected by real-time monitor 165 (e.g., from manufacturing machines and metrology machines). In still a further embodiment with a predictive model, data consolidator 140 consolidates virtual data that has been generated by predictor 150. Data consolidator 140 can also consolidate manually entered data (e.g., data entered by a device operator, maintenance personnel, etc.).

In one embodiment, data consolidator 140 stores consolidated received (actual) data in MICS data store 135. Alternatively, data consolidator 140 may store a subset of all consolidated received data in MICS data store 135. For example, data consolidator 140 may store consolidated data necessary to generate virtual data in MICS data store 135.

Real-time monitor 165 collects real-time data that includes present values of one or more equipment parameters. Such real-time data may be collected from sensors and systems to which MICS 105 is connected via network 125. Real-time monitor 165 may, for example, collect data from manufacturing equipment and metrology equipment as the data is generated. In one embodiment, real time monitor 165 provides the real-time data to data consolidator 140.

The methods, models and/or algorithms used to generate virtual data may depend on the parameter being predicted. For example, a first simulation model may be used to predict future values of a first parameter, and a second simulation model may be used to predict future values of a second parameter.

Data consolidator 140 may consolidate the virtual data with the consolidated received data in the MICS data store 135. Virtual data and received data may be consolidated such that the virtual data is aligned with associated received data. Thus, for example, if the received data represents a database field of machine buffer length, and this value is being predicted, the virtual data would represent predicted machine buffer length.

Decision support logic component 155 can provide recommendations and decisions based on the historical and current operational status (e.g., received data of past and present values). Decision support logic component 155 may also provide recommendations and decisions based on future operational status (e.g., virtual data of future values). The decision support logic component 155 may provide such recommendations and decisions based on business logic that matches a set of values with an outcome. The outcome may, for example, cause maintenance personnel to be notified of a pending machine failure, cause a process engineer to be notified of abnormal measurement results, etc. The outcome may also recommend actions to be taken. For example, the outcome may recommend that particular maintenance be performed on a machine.

Execution logic component 160 can be responsible for taking action on the business systems based on the output of the decision support logic component 155. These actions are in the form of intelligent business rules that can be launched either through real-time system events, predicted events, or scheduled activities. For example, execution logic 160 may automatically schedule maintenance for a machine when certain values are detected, automatically shut down the machine, etc.

MICS 105 may also include an equipment health subsystem (EHS) 145. The EHS 145 uses the data in the MICS data store 135 to perform fault detection analysis for various tools in the manufacturing environment. Fault detection can be performed by components of the MES 110 which may forward the associated fault detection data to the MICS 105. Alternatively or in addition, faults can be predicted by the MICS 105 based on equipment parameters received from the MES 110 and/or other sources of the manufacturing environment. Fault detection and/or prediction can be performed using specific fault detection methods, which can be static or change over time. The EHS 145 may also perform analysis of equipment data stored in the MICS data store 135 to define a statistical health model of a tool that represents a normal health state of the tool. The EHS 145 may utilize different univariate analysis (UVA) models (e.g., based on an average of temperature or pressure values, based on a mean of temperature or pressure values, etc.).

In one embodiment, the EHS 145 fault detection methods correspond to physical models of the system or component of the system. These physical models may be directly obtained from an understanding of the operation of the system, or may be phenomenological, i.e., they may be physical model forms that are tuned with empirical data.

In one embodiment, the EHS 145 provides a GUI that allows a user to select a specific tool, presents fault detection outputs available for the selected tool, and allows the user to select one or more of the presented fault detection outputs. The EHS 145 can then apply a multivariate analysis (MVA) technique such as Principle Components Analysis (PCA) to the selected fault detection outputs to produce abnormal health indicators of the tool.

PCA can be referred to a mathematical procedure that uses an orthogonal transformation to convert a set of observations of possibly correlated variables into a set of values of linearly uncorrelated variables called principal components. The number of principal components can be less than or equal to the number of original variables. In particular, PCA can take 'n' input variables, and find a linear combination of those variables that defines the vector of highest variability. This component is referred as the first principle component or "T" or "signal" statistic. What is left after removing the variability from the principle component is referred to as the "residual" or "Q" statistic. PCA can reduce complex and high order data sets to a (much) smaller number of principle components that capture vectors of strongest variability, can addresses correlation between variables, and can be configured to be adaptive over time.

In some embodiments, the EHS 145 plots the value of the T statistic and Q statistic to indicate the health of the tool, where the T statistic represents departure of current tool parameters from a normal state of the tool according to a statistical health model of the tool and the Q statistic indicates level of agreement (or disagreement) with the statistical health model of the tool.

Upon the user selection of fault detection outputs, the EHS 145 can display the abnormal health indicators in the GUI (e.g., using T statistic or Q statistic). The abnormal health indicators can be displayed irregardless of the fault detection methods that are provided for the tool. In some embodiments, the EHS 145 automatically updates the abnormal health indicators if the fault detection methods are modified or if a user intervenes and suggests a reduced set. The EHS 145 can deduce and display different abnormal health indicators based on different recipes. The EHS 145 can also update the abnormal health indicators on a "run-to-run" basis or a wafer-to-wafer basis. In some embodiments, the EHS 145 recreates MVA indicators to adapt to tool condition changes or to adapt to an occurrence of a specific event such as a recipe change. The EHS 145 can also present context event indications with MVA indicators (e.g., to reduce false alarms to user).

In some embodiments, control rule strategies or manual intervention can be used to reset the MVA or PCA models. This resetting can happen, for example, if a number of false positives are observed or if the target equipment is in a significantly different state, e.g., after a maintenance event. In some embodiments, the EHS 145 uses physical or phenomenological information as inputs to the PCA model, in further embodiments, the EHS 145 adjusts the inputs to the PCA model to be smaller models pertaining to the health of the tool, where these models are derived by exercising the EHM and seeing persistent patterns in terms of contributors associated with specific abnormality indications.

Though the exemplary architecture 100 described above is of a manufacturing environment, embodiments of the present invention may also operate in other environments such as an investment environment (e.g., for trading stocks, bonds, currencies, etc.), a research environment, etc. In such alternative environments, no manufacturing execution system may be present, and the manufacturing information and control system may instead be a research information and control system, investment information and control system, etc.

Figure 2:
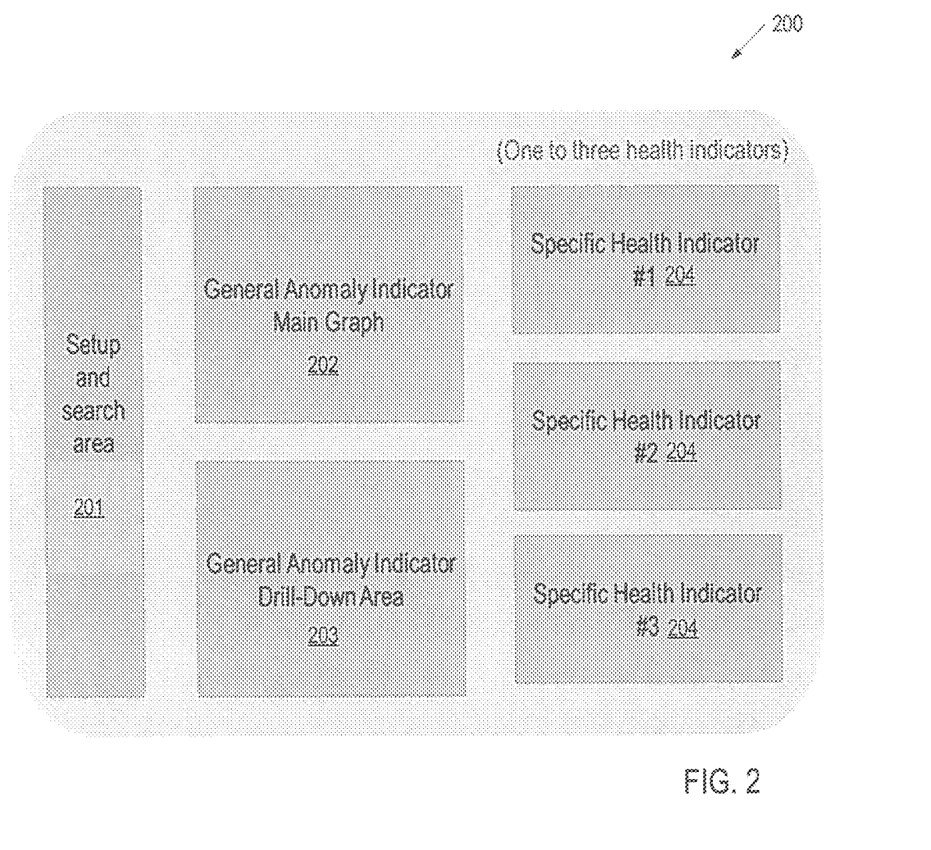
FIG. 2 illustrates a layout of an example user interface, in accordance with one embodiment of the present invention.

FIG. 2 illustrates a layout of an example equipment health user interface through which a user can monitor, control, and/or predict system operations, in accordance with embodiments of the present invention. The setup and search area 201 can allow the user to specify a certain tool or a tool instance and input certain criteria for the selected tool such as one or more fault detection outputs. The general anomaly indicator graph 202 can show the current values of particular data, in comparison to established normal parameters for the data, thereby providing information that can contribute to the assessment of general health of the equipment. The general anomaly drill-down area 203 can show the pareto of contributors to the data from the general anomaly indicator graph 202; these contributors can then be investigated for their contribution to the current state of health of the equipment. A pop-up window can be used to provide a run-to-run plot of a particular method contributor or a trace data plot of the data relating to the method. The specific health indicators 204 can provide indications of health for key components specific to a tool time (e.g., pad wear on a CMP (chemical mechanical polishing/planarization) tool). The specified point in time may be adjusted, such that past key performance indicator values are shown, present key performance indicator values are shown, or future key performance indicator values are shown. If future key performance indicator values are shown, data quality indicators may be shown in association with the values, these data quality indicators could be utilized to assess the confidence in the prediction of equipment health.

In some embodiments, fault detection methods are added to improve the EHS capabilities or to allow the EHS to more easily indicate equipment component health issues. For example, exploration of Pareto of contributors to specific health issues in area 203 can indicate that a sub-set of fault detection methods are primarily and consistently associated with a particular component health issue. A new method (in this case an MVA method consisting of the subset of fault detection methods associated with the health issue) can be created that is correlated to this component health issue. Thus, in future EHM health issue indications, if the health issue is this new modeled issue, it would appear as the sole primary contributor in the Pareto area 203. EHM can then be used to directly indicate a component health issue and potentially the specific problem and possibly remedy. This approach can be repeated so that each component health issue that has a consistent pattern can be represented as a fault detection component model.

In another embodiment, the key performance indicator visualization may be animated to dynamically display the evolution of indicator values from the past through the present into the future in a compressed time format. For example, the animation may equate one second of display time to one hour of factory time. The indicators may be animated to illustrate data from one week in the past, through the present, to one week in the future (in an approximately 6 minute animation). As the animation crosses the present time boundary into the prediction space, the visualization may choose to also display data quality indicators along with the predicted values e.g., by superimposing these values on the animation for all time values greater than the present time.

In yet another embodiment, indicators from multiple chambers may be presented on the same graph and summary statistics capturing the differences between chambers reported, e.g., graphically or numerically, to provide an indication of health from chamber-to-chamber. This can be used to derive a health metric and health indications for the fleet of chambers and individual chambers, and can also be used as a tool to match chambers and investigate sources of mismatch.

The key performance indicators may be user defined, and may depend on a system with which they are associated. For example, an alternative dashboard view of key performance indicators of a particular department within a manufacturing facility may be shown. Key performance indicators included in such an alternative dashboard view may include statuses of particular categories of machines, throughput, downtime, etc.

Figure 3:
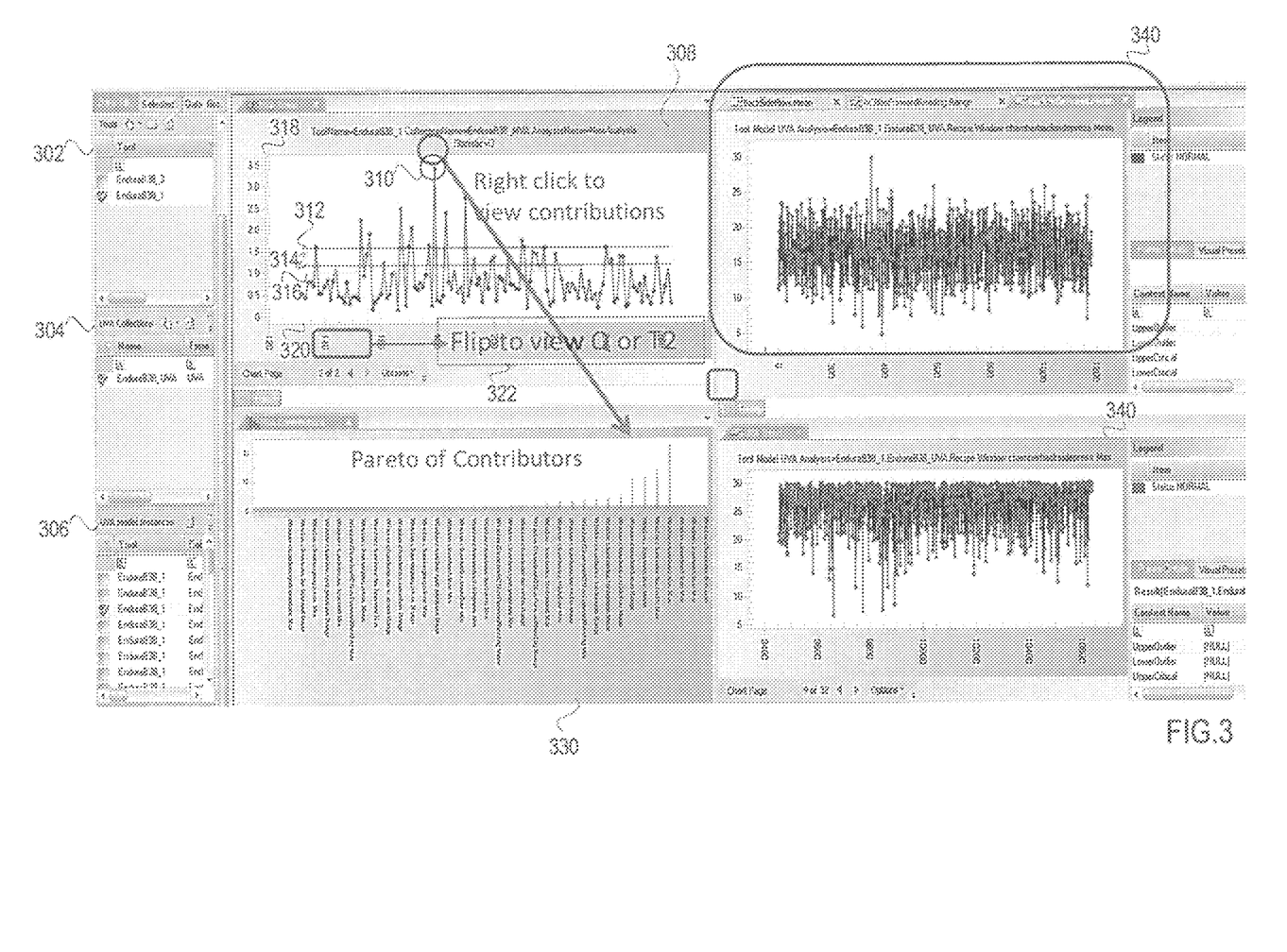
FIG. 3 illustrates an example user interface providing indicators of equipment health, in accordance with another embodiment of the present invention.

FIG. 3 illustrates an example user interface 300 for providing a portable equipment health dashboard in accordance with some embodiments. User interface 300 may use the layout described in FIG. 2. User interface 300 may be in the form of a dashboard and may include multiple tiled windows showing different real and/or virtual data. More or fewer windows may be shown. Data to be displayed in windows can be selected from a data selection list, and visualizations to use to display the data may be selected from a data views list. Examples of visualization options include graphing the data, providing a data overlay, providing an animation of the data, etc. Some or all of the windows may provide simultaneous representation and visualization of received data and virtual data. Any of the windows may be individually advanced forward or stepped backward in time to view past values, present values or predicted future values. Alternatively, all windows may be advanced forward or stepped backward in time together.

The user can select a tool from a list of tools 302 and then select fault detection outputs 304 and/or 306 for the tool. In this manner, user can select all fault detection outputs, or particular fault detection outputs; these outputs can be used as an input data set to multivariate analysis such as PCA. This analysis produces graph 308 showing abnormal health indicators that represent certain distances from the normal state 320 of the tool. The distances are defined using the vertical axes 318. Each point of the graph 308 can correspond to a wafer run and represent the T statistic or Q statistic. As shown by block 322, the graph can be converted from the T statistic to the Q statistic and vice versa.

Horizontal lines 316, 314 and 312 can represent a warning state, an alarm state, and a shut-down state respectively, and can be defined by a user or deduced from obtained data. Context information can be overlayed on the graph as, for example, vertical bars (not shown).

The graph 308 can be periodically refreshed and the remaining time before the next refresh can be shown (e.g., 12 seconds). Any point of the graph 310 can be selected to display the pareto of contributors to the selected point in the drill-down area 330. In addition, indicators of health of key components of the tool can be shown in windows 340 using UVA or small MVA models.

Some aspects of the present disclosure provide for health indicators of multiple tools to be overlayed on the same equipment health dashboard 300 to allow viewer to compare and investigate chambers that are more abnormal.

Figure 4:
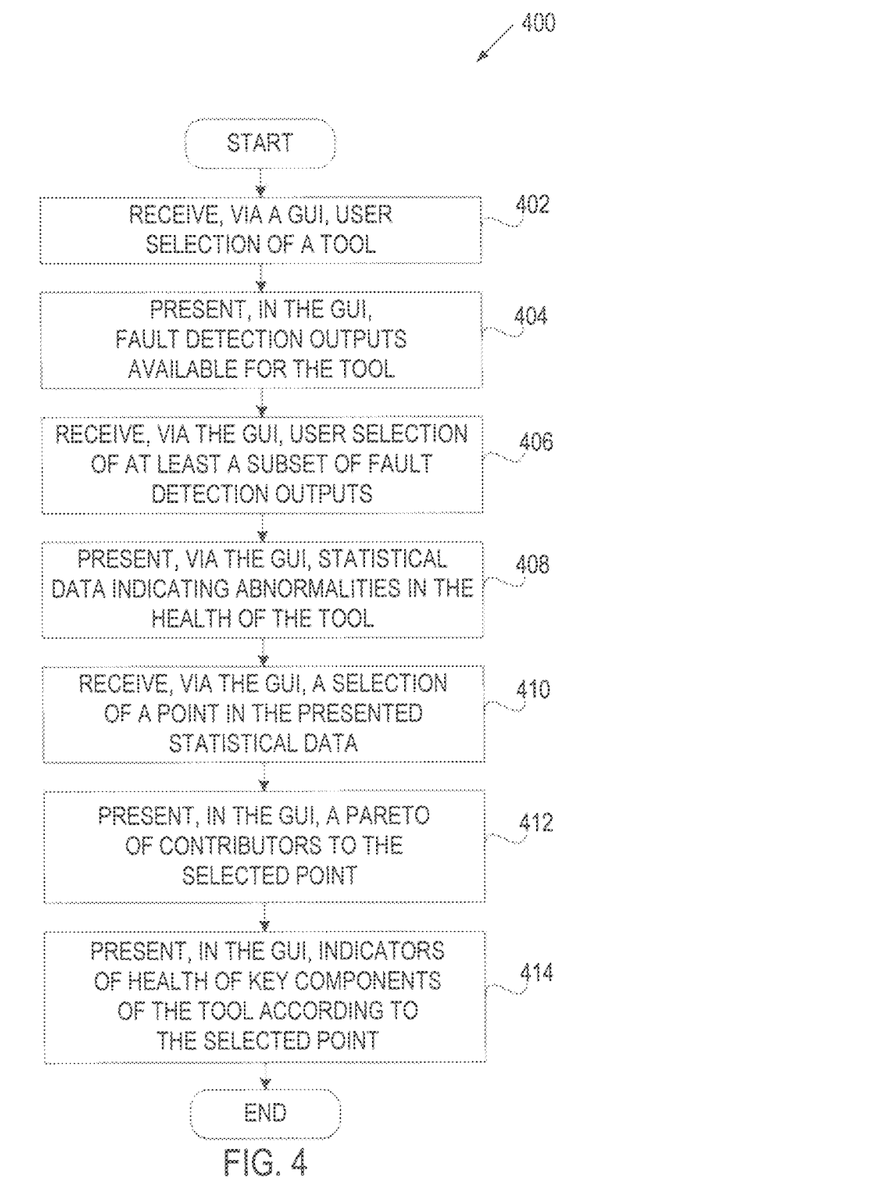
FIG. 4 is a flow diagram of one embodiment of a method for providing a portable equipment health dashboard.

FIG. 4 is a flow diagram illustrating a method 400 for presenting an equipment health user interface, according to some implementations of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by equipment health subsystem 145 as shown in FIG. 1.

Referring to FIG. 4, method 400 begins at block 402 with receiving a user selection of a tool via a GUI. At block 404, method 400 presents in the GUI fault detection outputs available for the tool. At block 406, method 400 receives, via the GUI, user selection of at least a subset of fault detection outputs. At block 408, method 400 generates statistical data indicating abnormalities in the health of the tool and presents the statistical data in the GUI.

At block 410, method 400 receives, via the GUI, user selection of a portion (e.g., a specific value or point) of the statistical data. At block 412, method 400 presents, in the GUI, a pareto of contributors to the selected statistic. At block 414, method 400 presents in the GUI indicators of the health of key components of the tool via UVA or small MVA models.

Figure 5:
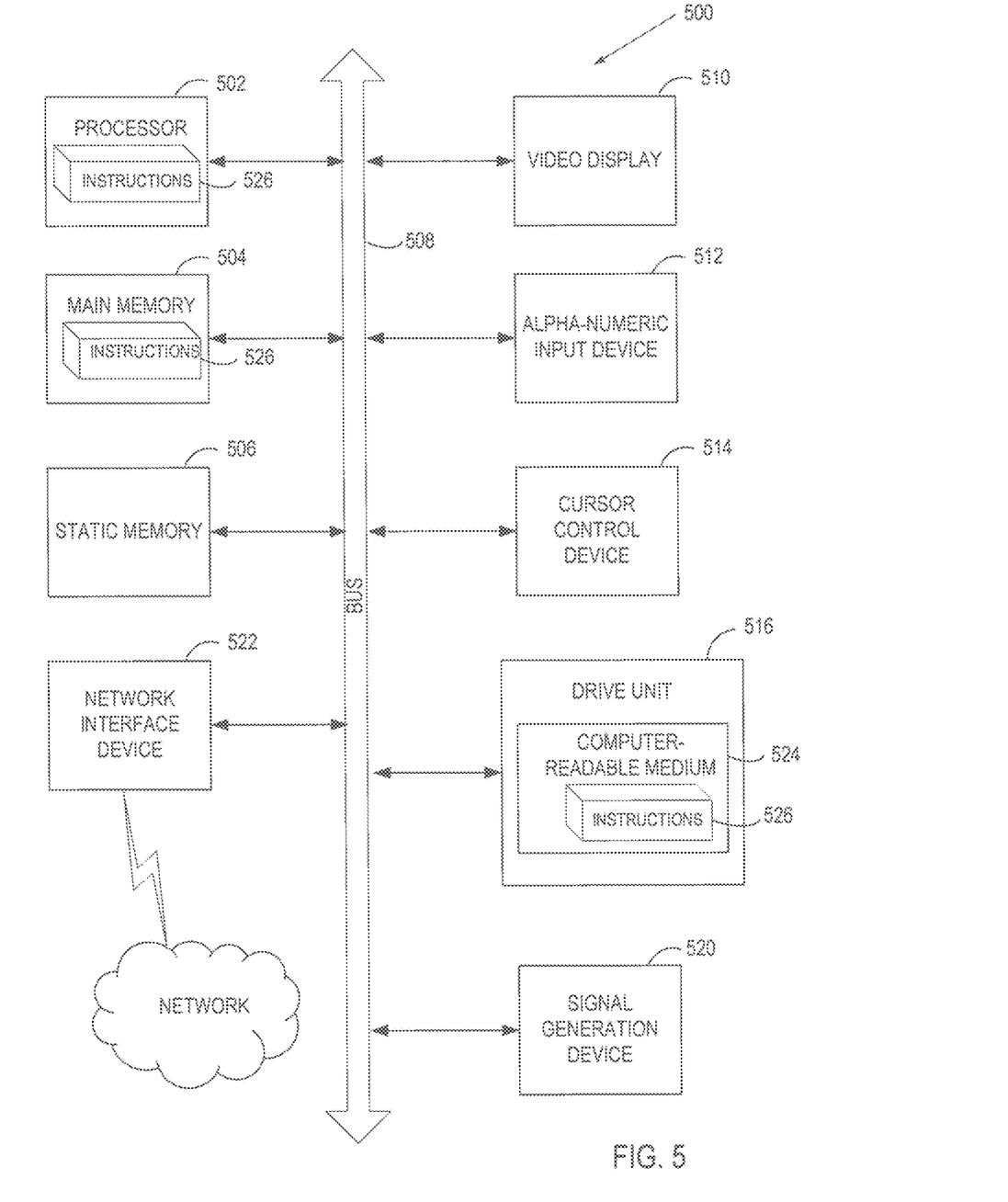
FIG. 5 illustrates a block diagram of an exemplary computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 574 via the network interface device 522.

In one embodiment, the instructions 526 include instructions for implementing an equipment health subsystem 145. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "accessing", "receiving", "determining", "restricting," "deleting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

What is claimed is:

1. A computer-implemented method comprising:
   receiving, by a processing device over a network from a plurality of tools, data comprising values of equipment parameters of the plurality of tools, wherein the values are collected during a manufacturing process;
   receiving, by the processing device via a user interface, user selection of fault detection data pertaining to a tool of the plurality of tools, wherein the data comprises the fault detection data;
   generating, by the processing device via a multivariate analysis, health abnormality indicators of the tool using the fault detection data and a statistical health model of the tool that corresponds to a normal health state of the tool;
   presenting, by the processing device via a graph of the user interface, the health abnormality indicators of the tool, wherein each of the health abnormality indicators is a corresponding data point that is a corresponding distance from the normal health state of the tool, the corresponding distance being defined by an axis of the graph, wherein a first distance from the normal health state of the tool corresponds to one or more of a warning health state of the tool, an alarm health state of the tool, or a shut-down health state of the tool, wherein each corresponding data point corresponds to a run of the manufacturing process corresponding to the tool;
   receiving, by the processing device via the graph of the user interface, a data point selection of a data point corresponding to a health abnormality indicator presented on the graph, the data point being a distance from the normal health state of the tool;
   identifying, by the processing device, a plurality of contributors to the data point, wherein the plurality of contributors cause a difference between the data point and the normal health state of the tool; and
   populating, by the processing device, a drill-down area of the user interface with the plurality of contributors to the data point and, for each of the plurality of contributors, a corresponding quantity of contribution to the difference between the data point and the normal health state, wherein a user is to investigate one or more of the contributors for contribution to a current state of health of the tool in response to the presenting of the contributors.

2. The method of claim 1 wherein:
   the fault detection data is created using a first fault detection method; and
   the health abnormality indicators are automatically updated when the first fault detection method is replaced with a second first detection method for the tool.

3. The method of claim 1 wherein the generating of the health abnormality indicators of the tool comprises:
   performing principal component analysis of the fault detection data to produce signal statistics and residual statistics that define the health abnormality indicators for the tool, wherein the signal statistics represents a departure of current tool parameters from the normal health state of the tool according to the statistical health model of the tool, and wherein the residual statistics represent a level of agreement with the statistical health model of the tool.

4. The method of claim 3 further comprising:
   updating the statistical health model of the tool in response to at least one of a context event, an expiration of a predefined time interval or a user request; and
   presenting an indication of the context event with the health abnormality indicators in the user interface.

5. The method of claim 1 further comprising:
   identifying a subset of the fault detection data that corresponds to a specific component of the tool; and
   presenting, via a window of the user interface, a specific health indicator corresponding to the specific component.

6. The method of claim 1 wherein the presenting of the health abnormality indicators of the tool in the user interface comprises:
presenting, via the graph in the user interface, a visual representation of the normal health state of the tool and at least one of a first visual representation of the warning health state of the tool, a second visual representation of the alarm health state of the tool, or a third visual representation of the shut-down health state of the tool.

7. The method of claim 1 further comprising:
presenting, in the user interface, at least one of the plurality of tools for user selection or a plurality of instances of the tool for user selection; and
when two or more of the plurality of tools are selected, presenting corresponding health abnormality indicators of the two or more of the plurality of tools in the user interface.

8. The method of claim 4 wherein the statistical health model of the tool is updated using physical or statistical information as input.

9. The method of claim 4 further comprising:
adjusting inputs to the statistical health model of the tool to be smaller models pertaining to the health of the tool.

10. A system comprising:
a memory;
a processing device coupled to the memory; and
an equipment health subsystem, executed from the memory by the processing device, to:
receive, over a network from a plurality of tools, data comprising values of equipment parameters of the plurality of tools, wherein the values are collected during a manufacturing process;
receive, via a user interface, user selection of fault detection data pertaining to a tool of the plurality of tools, wherein the data comprises the fault detection data;
generating, by the processing device via a multivariate analysis, health abnormality indicators of the tool using the fault detection data and a statistical health model of the tool that corresponds to a normal health state of the tool;
present, via a graph of the user interface, the health abnormality indicators of the tool, wherein each of the health abnormality indicators is a corresponding data point that is a corresponding distance from the normal health state of the tool, the corresponding distance being defined by an axis of the graph, wherein a first distance from the normal health state of the tool corresponds to one or more of a warning health state of the tool, an alarm health state of the tool, or a shut-down health state of the tool, wherein each corresponding data point corresponds to a run of the manufacturing process corresponding to the tool;
receive, via the graph of the user interface, a data point selection of a data point corresponding to a health abnormality indicator presented on the graph, the data point being a distance from the normal health state of the tool;
identify a plurality of contributors to the data point, wherein the plurality of contributors cause a difference between the data point and the normal health state of the tool; and
populate a drill-down area of the user interface with the plurality of contributors to the data point and, for each of the plurality of contributors, a corresponding quantity of contribution to the difference between the data point and the normal health state, wherein a user is to investigate one or more of the contributors for contribution to a current state of health of the tool in response to presenting of the contributors.

11. The system of claim 10 wherein:
the fault detection data is created using a first fault detection method; and
the health abnormality indicators are automatically updated when the first fault detection method is replaced with a second first detection method for the tool.

12. The system of claim 10 wherein the equipment health subsystem generating the health abnormality indicators of the tool comprises:
performing principal component analysis of the fault detection data to produce signal statistics and residual statistics that define the health abnormality indicators for the tool, wherein the signal statistics represents a departure of current tool parameters from the normal health state of the tool according to the statistical health model of the tool, and wherein the residual statistics represent a level of agreement with the statistical health model of the tool.

13. The system of claim 12 wherein the equipment health subsystem is further to:
update the statistical health model of the tool in response to at least one of a context event, an expiration of a predefined time interval or a user request; and
present an indication of the context event with the health abnormality indicators in the user interface.

14. The system of claim 10 wherein the equipment health subsystem is further to:
present, via the graph in the user interface, a visual representation of the normal health state of the tool and at least one of a first visual representation of the warning health state of the tool, a second visual representation of the alarm health state of the tool, or a third visual representation of the shut-down health state of the tool.

15. A non-transitory computer-readable storage medium storing instructions which, when executed, cause a processing device to perform operations comprising:
receiving, over a network from a plurality of tools, data comprising values of equipment parameters of the plurality of tools, wherein the values are collected during a manufacturing process;
receiving, via a user interface, user selection of fault detection data pertaining to a tool of the plurality of tools, wherein the data comprises the fault detection data;
generating, by the processing device via a multivariate analysis, health abnormality indicators of the tool using the fault detection data and a statistical health model of the tool that corresponds to a normal health state of the tool;
presenting, via a graph of the user interface, the health abnormality indicators of the tool, wherein each of the health abnormality indicators is a corresponding data point that is a corresponding distance from the normal health state of the tool, the corresponding distance being defined by an axis of the graph, wherein a first distance from the normal health state of the tool corresponds to one or more of a warning health state of the tool, an alarm health state of the tool, or a shut-down health state of the tool, wherein each corresponding data point corresponds to a run of the manufacturing process corresponding to the tool;

receiving, via the graph of the user interface, a data point selection of a data point corresponding to a health abnormality indicator presented on the graph, the data point being a distance from the normal health state of the tool;

identifying a plurality of contributors to the data point, wherein the plurality of contributors cause a difference between the data point and the normal health state of the tool; and populating a drill-down area of the user interface with the plurality of contributors to the data point and, for each of the plurality of contributors, a corresponding quantity of contribution to the difference between the data point and the normal health state, wherein a user is to investigate one or more of the contributors for contribution to a current state of health of the tool in response to the presenting of the contributors.

16. The non-transitory computer-readable storage medium of claim 15 wherein:

the fault detection data is created using a first fault detection method; and the health abnormality indicators are automatically updated when the first fault detection method is replaced with a second first detection method for the tool.

17. The non-transitory computer-readable storage medium of claim 15 wherein the generating of the health abnormality indicators of the tool comprises:

performing principal component analysis of the fault detection data to produce signal statistics and residual statistics that define the health abnormality indicators for the tool, wherein the signal statistics represents a departure of current tool parameters from the normal health state of the tool according to the statistical health model of the tool, and wherein the residual statistics represent a level of agreement with the statistical health model of the tool.

18. The non-transitory computer-readable storage medium of claim 17 further comprising:

updating the statistical health model of the tool in response to at least one of a context event, an expiration of a predefined time interval or a user request.

19. The non-transitory computer-readable storage medium of claim 18 further comprising:

presenting an indication of the context event with the health abnormality indicators in the user interface.

20. The non-transitory computer-readable storage medium of claim 15 wherein the presenting of the health abnormality indicators of the tool in the user interface comprises:

presenting, via the graph in the user interface, a visual representation of the normal health state of the tool and at least one of a first visual representation of the warning health state of the tool, a second visual representation of the alarm health state of the tool, or a third visual representation of the shut-down health state of the tool.

* * * * *